United States Patent
Ziegler

(10) Patent No.: US 8,464,847 B2
(45) Date of Patent: Jun. 18, 2013

(54) FRICTION BRAKE HAVING A CONTACT SURFACE PROVIDED BETWEEN TWO BRAKE ELEMENTS

(75) Inventor: Marcus Ziegler, Rasdorf (DE)

(73) Assignee: Siemens Aktiengesellschaft, München (DE)

( * ) Notice: Subject to any disclaimer, the term of this patent is extended or adjusted under 35 U.S.C. 154(b) by 787 days.

(21) Appl. No.: 12/526,186

(22) PCT Filed: Feb. 6, 2008

(86) PCT No.: PCT/EP2008/051435
§ 371 (c)(1),
(2), (4) Date: Aug. 6, 2009

(87) PCT Pub. No.: WO2008/095949
PCT Pub. Date: Aug. 14, 2008

(65) Prior Publication Data
US 2009/0321194 A1    Dec. 31, 2009

(30) Foreign Application Priority Data
Feb. 7, 2007    (DE) .................. 10 2007 006 164

(51) Int. Cl.
*F16D 55/00* (2006.01)
*F16D 19/00* (2006.01)

(52) U.S. Cl.
USPC ....... 188/71.1; 188/71.4; 188/73.1; 188/73.2; 192/84.31; 192/84.96

(58) Field of Classification Search
USPC ........... 188/71.1, 71.4, 73.1, 73.2; 192/84.31, 192/84.96
See application file for complete search history.

(56) References Cited

U.S. PATENT DOCUMENTS

| | | | |
|---|---|---|---|
| 2,954,853 | A | 10/1960 | Maierson |
| 4,135,606 | A | 1/1979 | Lewis |
| 4,286,694 | A | 9/1981 | Kovac |
| 4,496,922 | A | 1/1985 | Pardee |
| 6,386,340 | B1 | 5/2002 | Milesi |
| 6,454,072 | B1 | 9/2002 | Kohler |

FOREIGN PATENT DOCUMENTS

| | | |
|---|---|---|
| AT | 215 819 B | 6/1961 |
| DE | 23 08 256 A | 2/1973 |
| DE | 37 22 031 A1 | 1/1989 |
| DE | 92 08 535 U1 | 9/1992 |
| DE | 94 06 858 U1 | 7/1994 |

(Continued)

*Primary Examiner* — Bradley King
*Assistant Examiner* — Mahbubur Rashid
(74) *Attorney, Agent, or Firm* — Henry M Feiereisen LLC

(57) ABSTRACT

The invention relates to a friction brake which can be used for a shaft and a bearing part that can be rotated in relation to each other about a rotational axis (3). The friction brake comprises two brake elements: the first brake element has a first friction surface (24) and has to be mechanically connected to the bearing part, and the second brake element has a second friction surface (25) and has to be mechanically connected to the shaft. The connectible and disconnectable dynamic effect of an actuation mechanism forces the two brake elements against each other during a braking action or stop in such a manner that the two friction surfaces (24, 25) rest one on the other and contact each other in the area of a contact surface (29, 30). The contact surface (29, 30) covers only a part of every friction surface (24, 25) at any point in time during a braking action or stop. The relative position of the contact surface (29, 30) in relation to any of the two friction surfaces (24, 25) changes during a braking action.

12 Claims, 2 Drawing Sheets

FOREIGN PATENT DOCUMENTS

Figure 1:
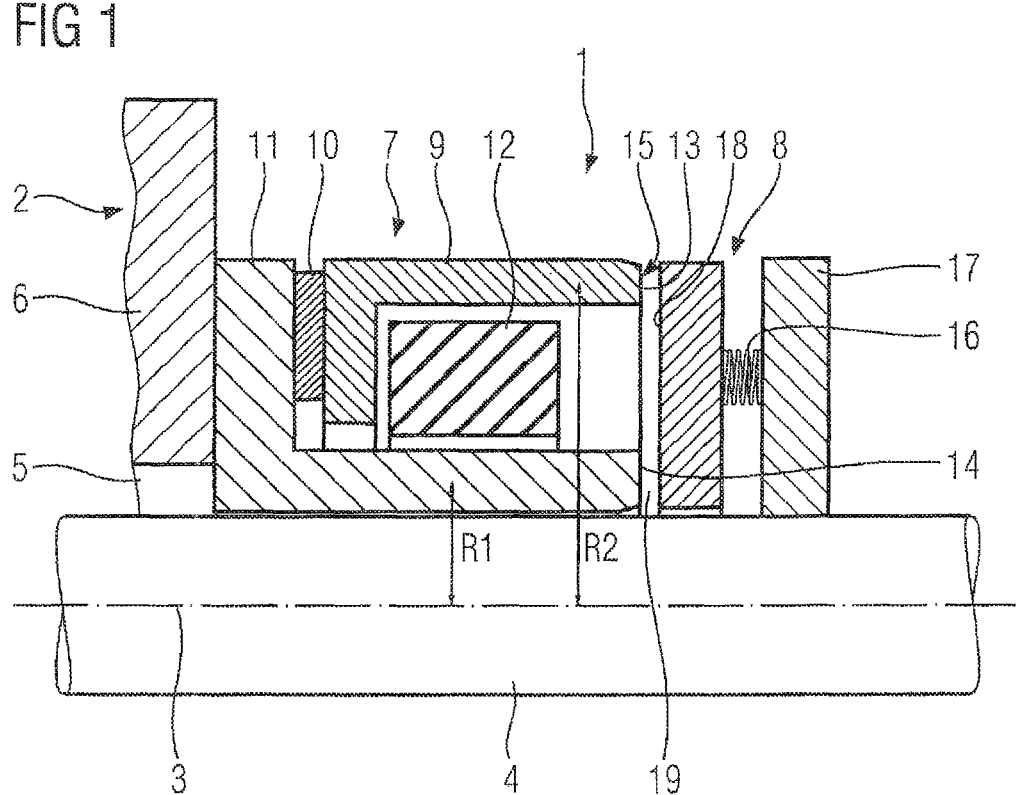

| | | |
|---|---|---|
| DE | 195 12 934 A1 | 10/1996 |
| DE | 196 48 908 A1 | 5/1998 |
| DE | 199 28 747 A1 | 12/2000 |
| DE | 100 46 903 C2 | 3/2003 |
| DE | 20 2004 001 042 U1 | 6/2004 |
| DE | 103 55 204 A1 | 8/2005 |
| DE | 10 2006 009 565 A1 | 9/2006 |
| EP | 0 521 843 A1 | 6/1992 |
| EP | 1 515 063 A1 | 3/2005 |
| WO | WO 2005/080819 A2 | 9/2005 |

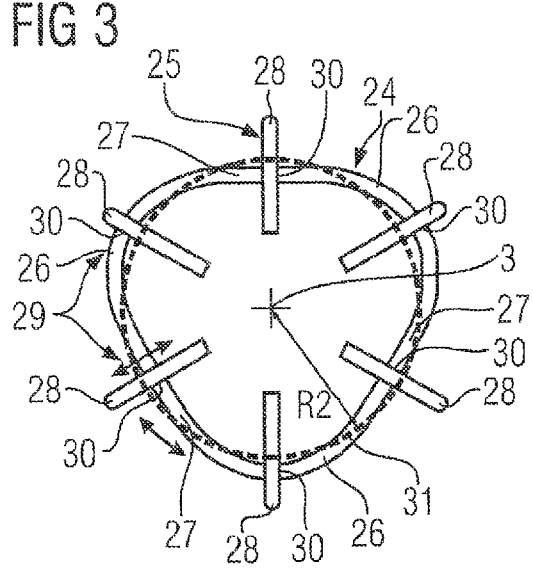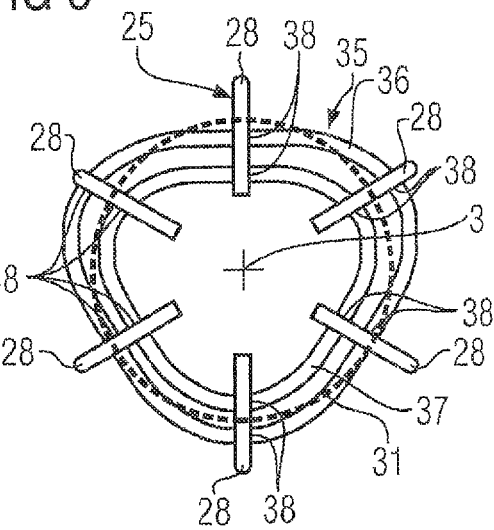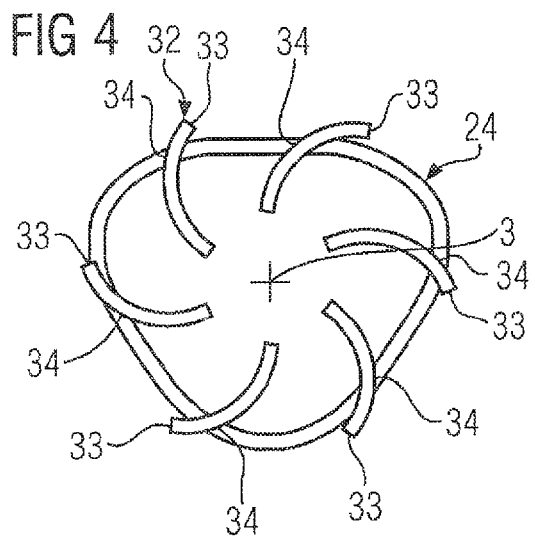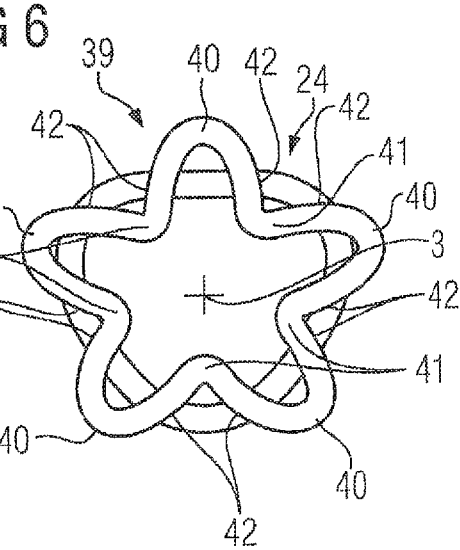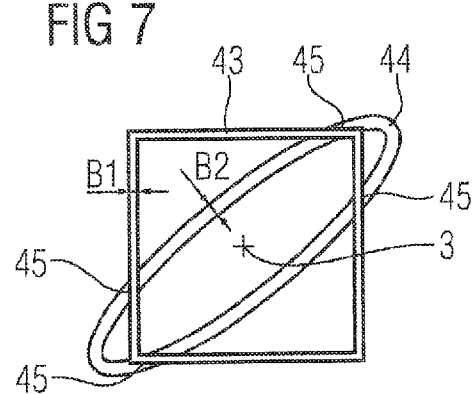

FRICTION BRAKE HAVING A CONTACT SURFACE PROVIDED BETWEEN TWO BRAKE ELEMENTS

CROSS-REFERENCES TO RELATED APPLICATIONS

This application is the U.S. National Stage of International Application No. PCT/EP2008/051435, filed Feb. 6, 2008, which designated the United States and has been published as International Publication No. WO 2008/095949 and which claims the priority of German Patent Application, Ser. No. 10 2007 006 164.3, filed Feb. 7, 2007, pursuant to 35 U.S.C. 119(a)-(d).

BACKGROUND OF THE INVENTION

The invention relates to a friction brake for a shaft and a mounting part which can rotate in relation to one another about a rotational axis, comprising two brake elements, the first brake element of which has a first friction surface and has to be mechanically connected to the bearing, and the second brake element has a second friction surface and has to be mechanically connected to the shaft, and an activation mechanism whose force effect, which can be switched on or off, presses the two brake elements against one another during a braking process or stopping process in such a way that the two friction surfaces bear against one another and are in contact in the region of a contact surface.

Such a friction brake is known, for example, from DE 100 46 903 C2. It is an emergency stop brake or stopping brake of an electric drive. The friction surfaces of these friction brakes which act against one another are of equal size and both annular. They each form in their entirety the given contact surface during the braking/stopping process. In a mechanically excited and controlled friction brake of this type, said contact surface should, on the one hand, not be too large in order to maximize the magnetic flux density passing through here, and therefore to maximize the magnetic cohesion which can be achieved. On the other hand, in order to conduct away heat a surface which is as large as possible is desirable. The compromise which always has to be made in practice in this regard can lead, in particular in the case of strong or long braking processes, to an accumulation of heat at the friction surfaces. The resulting overheating may reduce the braking effect or stopping effect.

In other known friction brakes such as, for example in the case of disk brakes which are used in a motor vehicle, the braking behavior may be impaired as a result of excessive generation of heat at one of the friction surfaces which are involved.

In order to avoid overheating, internally ventilated brake disks are also used. Because of the poor thermal conductivity of the steel of the brake disks, this measure does not have any effect in the case of strong, brief braking.

In the case of two-wheels, perforated brake disks have been used in order to reduce the vapor pressure occurring when there is moisture on the friction surface. This also is not capable of preventing overheating of the friction surfaces in all cases.

SUMMARY OF THE INVENTION

The object of the invention is therefore to specify a friction brake of the type designated at the beginning which also operates reliably in the case of strong or long braking processes.

This object is achieved by a friction brake for a shaft and a mounting pall which can rotate in relation to one another about a rotational axis, with the friction including a) two brake elements, the first brake element of which has a first friction surface and has to be mechanically connected to the mounting part, and the second brake element has a second friction surface and has to be mechanically connected to the shaft (4), and b) an activation mechanism whose force effect, which can be switched on or off, presses the two brake elements against one another during a braking process or stopping process in such a way that the two friction surfaces bear against one another and are in contact in the region of a contact surface, wherein the two friction surfaces are configured in such a way that c) the contact surface engages with only a part of each of the two friction surfaces at any point in time during a braking process or stopping process, and d) the relative position of the contact surface with respect to each of the two friction surfaces changes during a braking process.

The friction brake according to the invention is distinguished by the fact that the two friction surfaces are configured in such a way that the contact surface engages with only a part of each of the two friction surfaces at any point in time during a braking process or stopping process, and the relative position of the contact surface with respect to each of the two friction surfaces changes during a braking process.

In the friction brake according to the invention, the contact surface at which friction heat occurs at a particular time is always smaller than the two friction surfaces. Furthermore, the contact surface changes its position, in particular continuously, with respect to each friction surface. This is brought about, in particular, when the two friction surfaces do not have any rotational symmetry or circular symmetry with respect to the rotational axis. The two friction surfaces are therefore preferably rotationally asymmetrical or have circular asymmetry with respect to the rotational axis. Furthermore, the two friction surfaces differ from one another, in particular, in their geometric shape. As well as the position, the shape and/or the size of the contact surface can preferably change during the braking process. Consequently, only a part of each of the two friction surfaces is ever involved in the braking friction at a particular point in time. The other regions of the two friction surfaces which are not involved at this point in time can irradiate thermal energy until they are engaged again by the migrating contact surface and involved in the braking friction. During a relative rotation through 360° between the two friction surfaces, each region of the friction surfaces is preferably part of the contact surface at least once.

As a result, the friction heat which is produced is distributed over the friction surfaces which are relatively large compared to the contact surface. Furthermore, the radiation which occurs at the regions of the friction surface which are not engaged by the contact surface leads to cooling. In addition, the medium which surrounds the friction brake, that is to say for example the ambient air, can also cool the regions of the friction surfaces which do not form the contact surface at that particular time and, in particular, are freely accessible. This also contributes to the comparatively low operating temperatures. Overall, a relatively low energy density results, so that the influence of temperature is perceived less.

Above all, in the case of short but strong braking processes, adiabatic conditions can occur during which all of the thermal energy which is produced at the contact surface collects at the friction surfaces. The thermal capacity of the involved components of the brake elements plays a subordinate role here. In contrast, the conditions at the friction surfaces are decisive.

Owing to the relatively large available friction surface and since in the friction brake according to the invention the contact surface moves over the relatively large friction surfaces, the accumulation of heat between the two friction surfaces, which otherwise threatens to occur when the contact surface remains the same, either no longer occurs or only occurs when the brake loads are very much greater. In the friction brake according to the invention, a larger surface is involved in the friction process. As a result, the increase in temperature which occurs overall owing to the friction heat is reduced. The lower temperatures ensure a good braking force effect when the brake materials which are currently customary are used, and said lower temperatures also lead to less wear.

With the friction brake according to the invention it is possible, despite the friction surfaces which preferably have circular asymmetry, to achieve a braking torque which is substantially constant in the circumferential direction. This applies, in particular, if the contact surface is arranged distributed in a tangential direction (that is to say in the circumferential direction) with respect to the rotational axis.

The friction brake according to the invention can be used in various applications, for example in an electric drive, in a car or in a two-wheeled vehicle.

A variant in which at least one of the two friction surfaces is composed of a plurality of partial friction surfaces which are separated from one another is favorable. This promotes self-cleaning of the friction surfaces.

Furthermore, one of the two friction surfaces can preferably be composed of a plurality of strip-shaped partial friction surfaces which are distributed uniformly in a circumferential direction which is specified with respect to the rotational axis. This geometric shape is simple. It can easily be fabricated.

According to another preferred variant, the strip-shaped partial friction surfaces are each directed radially outward. In particular, the partial friction surfaces may extend radially outward as straight strip segments. This produces particularly good ventilation and cooling of the friction surface or surfaces.

This effect is increased further by inclining the strip-shaped partial friction surfaces, in particular, in each case with respect to the radial direction. Furthermore, this also has a favorable effect on the self-cleaning. Particles of dust are then removed particularly effectively from the friction surfaces.

Furthermore, the strip-shaped partial friction surfaces are preferably each embodied in a curved fashion, in particular as annular segments. They therefore have, for example, the cross-sectional shape of a fan or blade. This provides further advantages in terms of cooling.

In a further favorable configuration, at least one of the two friction surfaces has a strip shape which is nonannular, enclosed and, in particular, periodic in the circumferential direction. It then has, for example the shape of a rounded polygon or of an annulus with symmetrically distributed protrusions and depressions. In particular it is possible for in each case three protrusions and depressions to be provided in an alternating sequence distributed over the circumference of the circle.

There is furthermore also provision in an advantageous manner that the nonannular friction surfaces are produced by superimposing a sine function on a circular function. This provides in a particularly simple fashion periodicity in the circumferential direction which can also be manufactured easily, for example by means of a milling process.

According to a further favorable embodiment, the two friction surfaces each have a strip shape which is nonannular, enclosed and periodic in the circumferential direction, wherein the tangential periodicity of the first friction surface differs from that of the second friction surface. A deviation in the circumferential periodicity is easy to fabricate. Furthermore, differences in the geometric shape of the two friction surfaces promote the advantageous variation of the contact surface during a braking process.

It is preferably also possible for each of the two friction surfaces to be embodied in a strip shape and for a strip width of the first friction surface to differ from that of the second friction surface. The strip width is a further parameter which, given a different specification for the respective friction surface, causes the contact surface to vary during a braking process.

A variant in which the friction brake is embodied with magnetic excitation, and the first brake element has a first and a second magnetic pole, which are formed by partial friction surfaces, separated from one another, of the first friction surface which is embodied in a plurality of parts, is also favorable. In particular, the magnetic circuit of a permanently excited and electromagnetically switched friction brake can therefore be implemented particularly easily. In particular, in the case of the magnetically excited variant of the friction brake, it is also possible to provide that a magnetic flux passes through the contact surface. This provides a particularly good conduction of flux.

BRIEF DESCRIPTION OF THE BRAWING

Figure 2:
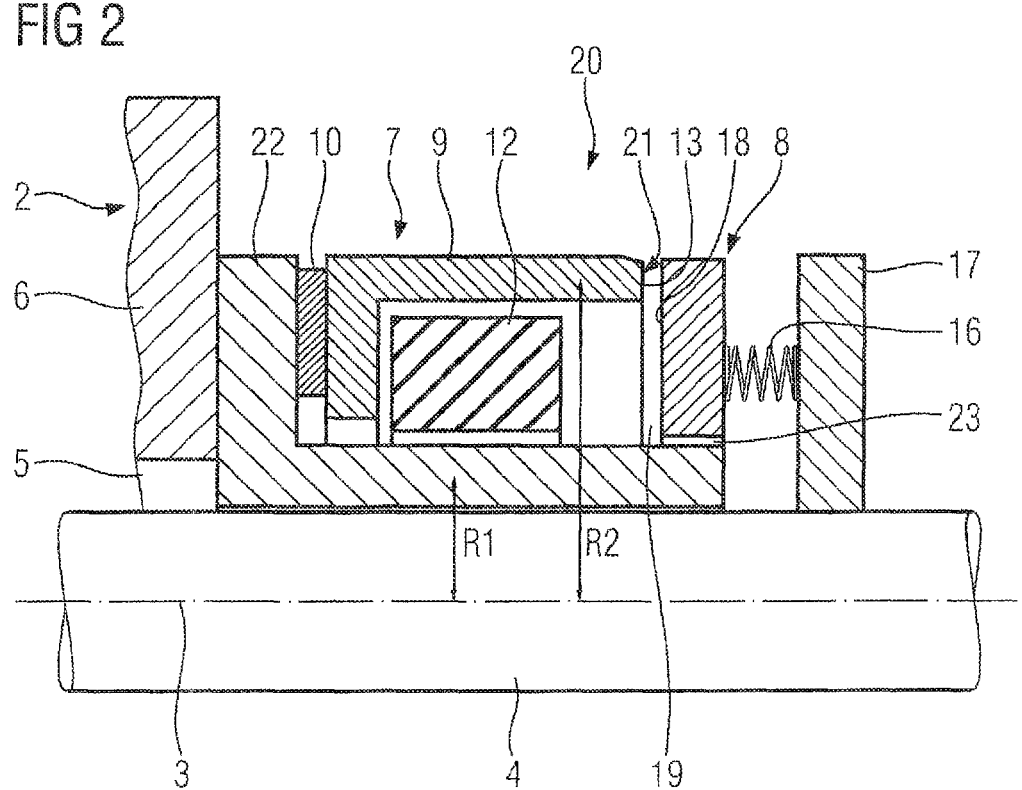

Further features, advantages and details of the invention emerge from the following description of exemplary embodiments with reference to the drawing, in which:

FIGS. 1 and 2 show two exemplary embodiments of friction brakes with a contact surface formed between two friction surfaces, and with one or two contact-forming magnetic pole(s), FIGS. 3 and 4 show exemplary embodiments of a combination of a single-part friction surface and a multi-part friction surface of a friction brake, FIG. 5 shows an exemplary embodiment of a combination of two multi-part friction surfaces of a friction brake, and FIGS. 6 and 7 show exemplary embodiments of a combination of a single-part friction surface and a multi-part friction surface of a friction brake.

DETAILED DESCRIPTION OF PREFERRED EMBODIMENTS

Parts which correspond to one another are provided with the same reference symbols in FIGS. 1 to 7.

FIG. 1 shows an exemplary embodiment of a friction brake 1 which has permanent-magnet excitation and can be activated electromagnetically, for an electric drive 2 in the form of an electric motor. The drive 2 comprises a shaft 4 which can be driven in rotation about a rotational axis 3 and which is rotatably mounted, by means of a bearing 5, in a stator 6 of the drive 2 (of which only a detail is shown schematically).

The friction brake 1 is composed substantially of two brake elements 7 and 8, the first brake element 7 of which comprises an external pole body 9, a permanent magnet 10, an internal pole body 11 and a solenoid coil 12 (=activation mechanism) which can be switched on and off and is arranged between the external pole body 9 and the internal pole body 11. The external pole body 9 and the internal pole body 11 each have, as a main component, a cylinder which is arranged concentrically with respect to the rotational axis 3, wherein a radius R2 of the cylinder of the external pole body 9 is larger than a radius R1 of the cylinder of the internal pole body 11. The first brake element 7 is securely mechanically connected to the stator 6, and therefore also to the bearing 5, by means of an attachment or connection flange of the internal pole body 11. On axial end sides, the external pole body 9 and the internal pole body 11 each have a partial friction surface 13 and 14, respectively, which together form the friction surface 15 of the first brake element 7.

The second brake element 8 is embodied as an armature disk or yoke. It is connected, by means of a spring mechanism 16 and a securing body 17 (only illustrated schematically) to the shaft 4 in a manner secured against rotation, and is therefore also connected to a rotor (not shown in more detail) of the electric drive 2. This connection permits axial movement in the direction of the rotational axis 3 and in relation to the shaft 4. The spring mechanism 16 is embodied, for example, as a flat spring. On the end side facing the first brake element 7, the second brake element 8 has a friction surface 18.

The method of operation of the friction brake 1 will be described in the text which follows.

The permanent magnet 10 generates a magnetic field which exits the external pole body 9 and internal pole body 11 perpendicularly at the partial friction surfaces 13 and 14, respectively. Magnetic poles are therefore formed at the partial friction surfaces 13 and 14. The magnetic field which exits here brings about magnetic attraction forces acting in the axial direction on the yoke of the second brake element 8. When the solenoid coil 12 is currentless, the yoke of the second brake element 8 is pressed with its friction surface 18 against the partial friction surfaces 13 and 14 of the first brake element 7 because of these attraction forces.

Contact surfaces (not designated in more detail in FIG. 1), are then produced between the two brake elements 7 and 8. In the case of the friction brake 1, the contact between the involved friction surfaces 15 and 18 therefore occurs precisely at the location of the two magnetic poles which are formed by the partial friction surfaces 13 and 14.

Owing to the pressure between the friction surfaces 15 and 18 of the two brake elements 7 and 8, frictional forces are produced which bring about a braking torque as a function of the location of their point of action, that is to say approximately at the distance R1 and R2 from the rotational axis 3.

If, on the other hand, current flows through the solenoid coil 12, a solenoid magnetic field which counteracts the magnetic field of the permanent magnet 10 is generated. The two magnetic fields substantially cancel one another out. The spring force of the spring mechanism 16 then pulls the yoke of the second brake element 8 away from the first brake element 7, with the result that an axial gap 19 is produced between the friction surfaces 15 and 18, and there is no longer any braking effect.

A further exemplary embodiment of a friction brake 20 which has permanent-magnet excitation and can be activated electromagnetically which is shown in FIG. 2 is of similar design to the friction brake 1. A significant difference is that the yoke of the second brake element 8 is in contact only with the partial friction surface 13 of the external pole body 9, that is to say just with one magnetic pole, during the braking process. The friction brake 20 therefore also has only a single-part friction surface 21 on its first brake element 7, which friction surface 21 is formed exclusively by the partial friction surface 13. The latter again determines the contact surface which makes contact with the yoke of the second brake element 8 during the braking process.

The first brake element 7 has a slightly modified internal pole body 22 whose cylinder is somewhat longer than in the case of the friction brake 1, and which extends into a central recess of the yoke of the second brake element 8. Between the cylinder end, which extends into the recess, and the yoke of the second brake element 8 a radial gap 23 is provided which has to be bridged by the magnetic flux both in the braked and in the unbraked states.

On the other hand, the braking torque behavior improves since only the external radius R2 is decisive, instead of the two effective radii R1 and R2. As a result, fluctuations in the braking torque which otherwise occur owing to different erosion of material at the surfaces which are determined by the two radii R1 and R2, that is to say at the partial friction surfaces 13 and 14, can be avoided.

In FIG. 1 and 2, the friction surfaces 15, 18 and 21 and the partial friction surfaces 13 and 14 are only indicated schematically. They can assume different shapes. Exemplary embodiments thereof are shown in FIGS. 3 to 7.

In the exemplary embodiments of combinations of friction surfaces of the first and the second brake elements 7 and 8 which are shown in FIGS. 3 to 7, the two friction surfaces are each always shaped in such a way that the contact surface, formed between the first and second brake elements 7 and 8 during a braking process, engages with only a part of each friction surface at any point in time during a braking or stopping process, and the relative position of the contact surface with respect to the two friction surfaces and, if appropriate, also the shape and/or size of the contact surface change continuously during a braking process. This is achieved, in particular, by virtue of the fact that the friction surfaces are each shaped differently and they both have no rotational symmetry or circular symmetry with respect to the rotational axis 3.

The contact surface at a particular time is therefore always smaller than any friction surface. As a result, in each case only a part, which varies over time during the braking process, of the two friction surfaces contributes to the braking friction. During the braking process, the contact surface passes over all the regions of the friction surfaces if the two friction surfaces are rotated once in relation to one another about the rotational axis 3. The locations on the two friction surfaces which are not involved in the braking process at a particular time become cooler owing to the irradiation of thermal energy and the interaction with the surrounding air. As a result, a very favorable temperature behavior is obtained. Overall, the temperature is kept at a relatively low level. This is advantageous for the braking effect.

Here, a friction surface is understood to be a surface of the first or second friction element 7 or 8 which can basically be involved in the friction during a braking process. The surface in this context may be a single coherent surface or else a plurality of partial surfaces which are separated from one another at least in the friction plane. On the other side of the friction plane, the regions which form the partial surfaces can, however, also be connected to one another mechanically. In contrast, the contact surface is understood to be the intersection of the friction surfaces of the first or second friction elements 7 or 8. The contact surface can also be in a single part or multiple parts. While the friction surfaces are formed by the selected design and also remain unchanged, the contact surface generally changes its position, shape and size during a braking process.

The size of the contact surface of the respective friction brake depends on the requirements made of the pressing force between the two brake elements 7 and 8. In order to increase the conduction away of heat, the friction surfaces can also be enlarged further without at the same time changing the contact surface and therefore the pressing force and the braking effect. Relatively large friction surfaces also lead to less erosion.

FIG. 3 shows a combination of a single-part, enclosed, nonannular friction surface 24 of the external pole body 9 and a multi-part friction surface 25 of the yoke of the second brake element 8. The two friction surfaces 24 and 25 are used in a friction brake which is comparable to that according to FIG. 2. In this example, contact is made with just one magnetic pole during a braking/stopping process.

The friction surface 24 is formed by superimposing a sine shape on an annular shape. Overall three sine periods are provided distributed uniformly over the length of the circumference. The friction surface 24 has three protrusions 26 extending outward and three depressions 27 extending inward. The friction surface 24 in the exemplary embodiment has approximately the shape of a rounded triangle.

The friction surface 25 is composed of a plurality of strip-shaped partial friction surfaces 28 (six in the example) arranged distributed uniformly in the circumferential direction. The partial friction surfaces 28 are each straight strip segments which extend radially outward and are arranged in a star shape. The radial outer ends of the partial friction surfaces 28 are rounded.

The friction surfaces 24 and 25 can, for example, be formed by axially protruding webs on the axial end sides, facing one another, of the external pole body 9 and of the yoke of the second brake element 8. Furthermore, the assignment of the friction surfaces 24 and 25 to the first or second brake element 7 or 8 can also be interchanged.

During the braking process, a multi-part contact surface 29, which is composed of a total of six partial contact surfaces 30 in the exemplary embodiment according to FIG. 3, is present between the two brake elements 7 and 8. The contact surface 29 is formed here by the intersection of the friction surfaces 24 and 25 at that particular time. The partial contact surfaces 30 change their respective position in relation to the two friction surfaces 24 and 25 during a relative rotation of the friction surfaces. This is indicated in FIG. 3 by the directional arrows on one of the partial contact surfaces 30.

Owing to the specific configuration of the friction surfaces 24 and 25, in each case two of the partial contact surfaces 30 lie opposite one another in relation to the rotational axis 3. Their central distance is twice the radius R2 of the circle 31 which is also represented in FIG. 3 by means of dashed lines. The total braking torque of such partial contact surfaces 30 which lie opposite one another is therefore practically independent of the current relative rotational angle between the friction surfaces 24 and 25.

The partial contact surfaces 30 change their respective radial distance from the rotational axis 3 as a function of the current relative rotational angle between the friction surfaces 24 and 25. This results in a cleaning effect for the friction surfaces 24 and 25. Particles of dirt are taken up during a relative rotational movement and conveyed in the direction of the outer or inner edge of the friction surfaces and therefore out of the zone in which friction takes place. Since the contact surfaces always engage with changing portions of the friction surfaces 24 and 25 during the friction process, water vapor can also escape very well from the friction surfaces 24 and 25. In particular, this does not require any perforation of the friction surfaces 24 and 25. Contamination and water films therefore do not have any effect, or only a very small effect, on the braking effect.

The circumferential periodicity of three, which is provided for the friction surface 24, permits easy fabrication of the friction surface 24 itself and furthermore also of the friction brake as a whole. The friction surface 24 can be manufactured with little complexity, for example by means of a milling process. If the friction surface 24 is provided on the yoke of the second brake element 8, the abovementioned circumferential periodicity furthermore permits very easy mounting of the spring mechanism 16, embodied as a flat spring arrangement, by means of six rivets, three of which are located in the region of the protrusions 26 on the yoke, and the other three of which are located on the securing body 17.

FIG. 4 shows a slightly modified exemplary embodiment of a combination of the single-part friction surface 24 and of a multi-part friction surface 32. The friction surface 32 also has partial friction surfaces 33 in the form of outwardly extending strip segments. However, the latter have a curvature which is directed outward, (i.e. in the direction of the outer edge of the friction surface 24), and an incline in relation to the radial direction. Said partial friction surfaces 33 are shaped in the manner of a fan cross section or blade cross section. The partial friction surfaces 33 also form together with the friction surface 24 partial contact surfaces 34, which change at least in their relative position during the friction process, of an in turn multi-part contact surface (not designated in more detail).

The subdivision of the friction surfaces 24 and 32 into the partial friction surfaces 28 and 33 brings about additional cooling of the friction surface 24 during a rotational movement of the yoke of the second brake element 8. The specific shape of the partial friction surfaces 28 and in particular of the partial friction surfaces 33 promotes an additional supply of air, which is also brought about by an impeller wheel.

FIG. 5 shows an exemplary embodiment, which is also slightly modified compared to FIG. 3, of a combination of the multi-part friction surface 25 with a further multi-part friction surface 35. The friction surfaces 25 and 35 of this combination are intended for use in a friction brake, in a way which is comparable to that according to FIG. 1. During the braking/stopping process, both the external pole body 9 and the internal pole body 11 are therefore involved in the formation of contact with the yoke of the second brake element 8.

The friction surface 35 which is assigned to the first brake element 7 therefore comprises two enclosed, nonannular partial friction surfaces 36 and 37. The latter each have a shape which is comparable to that of the friction surface 24 according to FIG. 3. The partial friction surface 37 of the internal pole body 11 is located completely within the partial friction surface 36 of the external pole body 9. During the braking process, a plurality of locally changing partial contact surfaces 38 are again formed on the respective intersection points between the strip-segment-shaped partial friction surfaces 28 of the friction surface 24 and the enclosed, but not annular, partial friction surfaces 36 and 37 of the friction surface 35.

FIG. 6 shows an exemplary embodiment of a combination of the single-part friction surface 24 with a further single-part friction surface 39. The friction surfaces 24 and 39 of this combination are intended for use in a friction brake which is comparable to that according to FIG. 2. The friction surface 39 is, like the friction surface 24, formed by superimposing a sine shape on an annular shape. However, in the case of the friction surface 39, five sine periods are provided distributed uniformly over the length of the circumference, instead of three. Accordingly the friction surface 39 has five outwardly extending protrusions 40 and five inwardly extending depressions 41. In the exemplary embodiment, the friction surface 39 is approximately in the shape of a rounded star. During the braking process, a plurality of locally changing partial contact surfaces 42 are again formed on the respective intersection points between the friction surfaces 24 and 39.

FIG. 7 shows a further exemplary embodiment of two single-part friction surfaces 43 and 44. Both friction surfaces 43 and 44 have an enclosed, but not annular, form. The friction surface 43 is embodied as a rectangle and the friction surface 44 as an ellipse, which rectangle and ellipse each have a different strip width B1 and B2, respectively, in the exemplary embodiment according to FIG. 7. Between them, a plurality of partial contact surfaces 45, which change in position and here also additionally in size and shape, are again formed on the respective intersection points during the braking process.

The favorable cooling and cleaning effects which were described in conjunction with the combination according to FIG. 3 are also provided in a similar way with the combinations according to FIGS. 4 to 7.

In order to assist the cooling effect, the yoke of the second brake element 8 can have an impeller wheel structure on a side facing away from the friction surface in all the exemplary embodiments above. Furthermore, the respective friction brake can preferably be arranged in the region of a winding head of an electric winding which is provided in the stator 6 of the electric drive 2. The cooling effect which is achieved owing to the specific configurations of the friction brakes can at the same time also be used to cool the winding head which is otherwise usually uncooled.

The favorable configurations of the friction surfaces and contact surfaces described above can basically also be used in other types of brake, that is to say in friction brakes which are not magnetically excited. The applications are likewise not restricted to electric machines. They can basically also be used in a motor vehicle or motorcycle.

What is claimed is:

1. A friction brake for a shaft and a mounting part which are rotatable in relation to one another about a rotational axis and are components of an electrical drive, wherein the friction brake is permanent magnetically excitable, said friction brake comprising:
    a first brake element having a first friction surface and mechanically connected to the mounting part, said friction surface forming a magnetic pole;
    a second brake element having a second friction surface and mechanically connected to the shaft, said first and second brake elements being magnetically attracted to one another; and
    an electromagnetically actuatable activation mechanism applying a force to press the first and second brake elements against one another during a braking process or stopping process in such a way that the first and second friction surfaces bear against one another and contact in a region of a contact surface, with a magnetic flux flowing through said contact surface,
    wherein the first and second friction surfaces are formed by axially protruding webs and are configured in such a way that the contact surface engages with only a part of each of the first and second friction surfaces at any point in time during a braking process or stopping process, and a relative position of the contact surface with respect to each of the first and second friction surfaces changes during a braking process.

2. The friction brake of claim 1, wherein at least one of the first and second friction surfaces is composed of a plurality of partial friction surfaces which are separated from one another.

3. The friction brake of claim 1, wherein one of the first and second friction surfaces is composed of a plurality of strip-shaped partial friction surfaces which are distributed uniformly in a circumferential direction which is specified with respect to the rotational axis.

4. The friction brake of claim 3, wherein the strip-shaped partial friction surfaces are each directed radially outward.

5. The friction brake of claim 3, wherein the strip-shaped partial friction surfaces are each inclined with respect to a radial direction.

6. The friction brake of claim 3, wherein the strip-shaped partial friction surfaces are each embodied in a curved fashion.

7. The friction brake of claim 3, wherein the strip-shaped partial friction surfaces are each embodied in the form of annular segments.

8. The friction brake of claim 1, wherein at least one of the first and second friction surfaces has a strip shape which is nonannular and enclosed.

9. The friction brake of claim 8, wherein the strip shape is periodic in a circumferential direction.

10. The friction brake of claim 8, wherein the nonannular friction surfaces are produced by superimposing a sine function on a circular function.

11. The friction brake of claim 1, wherein the first and second friction surfaces each have a strip shape which is nonannular, enclosed and periodic in the circumferential direction, wherein a tangential periodicity of the first friction surface differs from a tangential periodicity of the second friction surface.

12. The friction brake of claim 1, wherein each of the two friction surfaces is embodied in a strip shape, and a strip width of the first friction surface differs from a strip width of the second friction surface.

* * * * *